United States Patent [19]

Shyu et al.

[11] Patent Number: 4,918,611
[45] Date of Patent: Apr. 17, 1990

[54] METHOD AND APPARATUS FOR CONTROLLING LASER CUTTING BY IMAGE PROCESSING

[75] Inventors: Jia-Ming Shyu; Inn-Ming Chen; Chung C. Ku; Ting-Yao Chen; Yunghsueh Chao, all of Hsinchu Hsien, Taiwan

[73] Assignee: Industrial Technology Research Institute, Hsinchu Hsien, Taiwan

[21] Appl. No.: 220,513

[22] Filed: Jul. 18, 1988

[51] Int. Cl.⁴ .................. G06F 15/46; G06K 9/00
[52] U.S. Cl. .................. 364/474.08; 219/121.67; 358/101; 364/474.24; 364/474.29; 382/8
[58] Field of Search .................. 364/191–193, 364/474.05, 474.08, 474.24, 474.29; 219/121.67, 121.82, 121.83, 121.85, 121.78; 382/1, 8, 25, 28, 65; 356/376; 358/101, 107

[56] References Cited

U.S. PATENT DOCUMENTS

| 4,530,061 | 7/1985 | Henderson et al. | 219/121.67 X |
| 4,547,855 | 10/1985 | Lanyi et al. | 364/474.08 |
| 4,649,497 | 3/1987 | Carlson et al. | 219/121.6 X |
| 4,752,964 | 6/1988 | Okada et al. | 364/474.05 |
| 4,782,438 | 11/1988 | Mizukado et al. | 364/474.08 X |

OTHER PUBLICATIONS

"Bilevel-Thresholding: Moment-Preserving Approach" from *Computer, Vision Graphics, and Image Processing*, vol. 29, 1985, pp. 377-393.

"Algorithms for Graphics and Image Processing" from *Computer Science Press*, 1982, pp. 143 and 198.

*Primary Examiner*—Joseph Ruggiero
*Attorney, Agent, or Firm*—Birch, Stewart, Kolasch & Birch

[57] ABSTRACT

A method and apparatus is provided for controlling the laser cutting of a laser beam machine by image processing techniques. A photographing device is provided to photograph a pattern or material object and to obtain a pattern image. According to the pattern, an article is cut by the laser beam machine. The photographed pattern image is digitized and stored in an image processing card. In turn, by using image processing techniques, the digitized pattern image is thresholded, and contours and/or skeletons are extracted therefrom. Each of the extracted contours and/or skeletons is linked point by point to form a series of characteristic points, and the linked lines are stored in a memory device of a microcomputer. The linked lines are replaced by a plurality of vector points in a curve approximation process, and the vector points for each linked line form a series of line vector data. The sequence of all of the series of line vector data is rearranged from the innermost line to the outermost line, and the rearranged series of line vector data are converted into a computer numerical control (CNC) program which is in turn entered into a CNC device to control the cutting paths of the laser beam machine.

10 Claims, 4 Drawing Sheets

METHOD AND APPARATUS FOR CONTROLLING LASER CUTTING BY IMAGE PROCESSING

BACKGROUND OF THE INVENTION

The present invention relates to a method and apparatus for controlling laser cutting by image processing, and more particularly to a method and apparatus for controlling laser cutting, which can directly photograph a pattern or a material article to form a pattern image, convert the pattern image into a vector information by using a curve approximation process, and finally convert the vector information into a computer numerical control (CNC) program to control the cutting paths of a laser beam machine.

Presently, CNC laser beam machines are widely used in many industrial fields. For operating conventional machines, operators must have the necessary programming training and ability, and must calculate complicated coordinates of the pattern in order to input a CNC program into the CNC laser beam machine. Consequently, it is time-consuming to deal with the input program of the machine. The problem is more serious when an irregular pattern is desired to be input. As a result, the producing efficiency of the conventional laser beam machine is low, and the labor cost is relatively high. Therefore, it is greatly desired in this art to develop a laser beam machine having simplified input means without increasing manufacturing cost, while maintaining acceptable machining precision. However, so far no reasonable solution has been suggested.

SUMMARY OF THE INVENTION

The primary object of the present invention is to provide a method and apparatus for controlling laser cutting, which utilizes a rapid and convenient input means for photographing a pattern according to how an article is to be cut. The method and apparatus convert the photographed pattern image into vector information, and in turn into a CNC program to control the movement of the X-Y table of a laser beam machine so that the desired product can be cut by the laser beam.

Another object of the present invention is to provide a method and apparatus for controlling laser cutting, which can select the contours and/or skeletons of the photographed pattern image in order to control the laser beam to perform laser cutting along those contours and/or skeletons.

Yet another object of the present invention is to provide a method and apparatus for controlling laser cutting, which permits an operator to set the starting/terminating points of the laser beam for adequately arranging the sequence of cutting paths. The setting of the starting/terminating points will promote the cutting quality, and the arrangement of the sequence of cutting paths will simplify the cutting process and increase production efficiency.

According to the present invention, a method is provided for controlling the laser cutting of a laser beam machine, comprising the steps of:

(a) photographing an object with a photographing device for developing an original pattern image;
(b) thresholding the original pattern image to obtain a binary pattern image information;
(c) selecting one of the following three modes for the binary pattern image information:
  1. contour extracting mode for the pattern image information;
  2. skeleton extracting mode for the pattern image information;
  3. contour extracting mode for parts of the pattern image information, and skeleton extracting mode for other parts of the pattern image information;
(d) scanning the pattern image information and extracting the contours and/or skeletons of the pattern image information according to the mode selected in step (c);
(e) linking each of the contours and/or skeletons extracted in step (d), in a point by point sequence;
(f) converting each of the contours and/or skeletons into a series of line vector data by using a curve approximately process, respectively;
(g) setting a starting/terminating point of the laser beam machine for each series of line vector data;
(h) rearranging the sequence of the series of line vector data from the innermost line to the outermost line thereof; and
(i) converting the rearranged series of line vector data into a computer numerical control program, and inputting the program into a computer numerical control device to control the machining paths of the laser beam machine.

According to another aspect of the present invention, an apparatus is provided for controlling the laser cutting of a laser beam machine, comprising:

a photographing device adapted to photograph an object and to obtain an original pattern image;
an image processing station coupled to the photographing device, including:
  an image processing card for receiving the original pattern image, and for converting the original pattern image into a digital pattern image;
  means for thresholding the digital pattern image to obtain a binary pattern image information;
  means for extracting the contours and/or skeletons of the pattern image information therefrom;
  means for converting each of the extracted contours and/or skeletons into a series of line vector data;
  means for setting a starting/terminating point for each series of line vector data;
  means for rearranging the sequence of the series of line vector data from the innermost line to the outermost line thereof; and
  means for converting the rearranged series of line vector data into a computer numerical control program; and
a computer numerical control device coupled to the image processing station to receive the computer numerical control program, and adapted to be coupled to the laser beam machine so as to control the laser cutting of the laser beam machine in response to the computer numerical control program.

BRIEF DESCRIPTION OF THE DRAWINGS

The present invention can be more fully understood by reference to the following detailed description and accompanying drawings, which form an integral part of this application.

DETAILED DESCRIPTION OF THE PREFERRED EMBODIMENT

Figure 1:
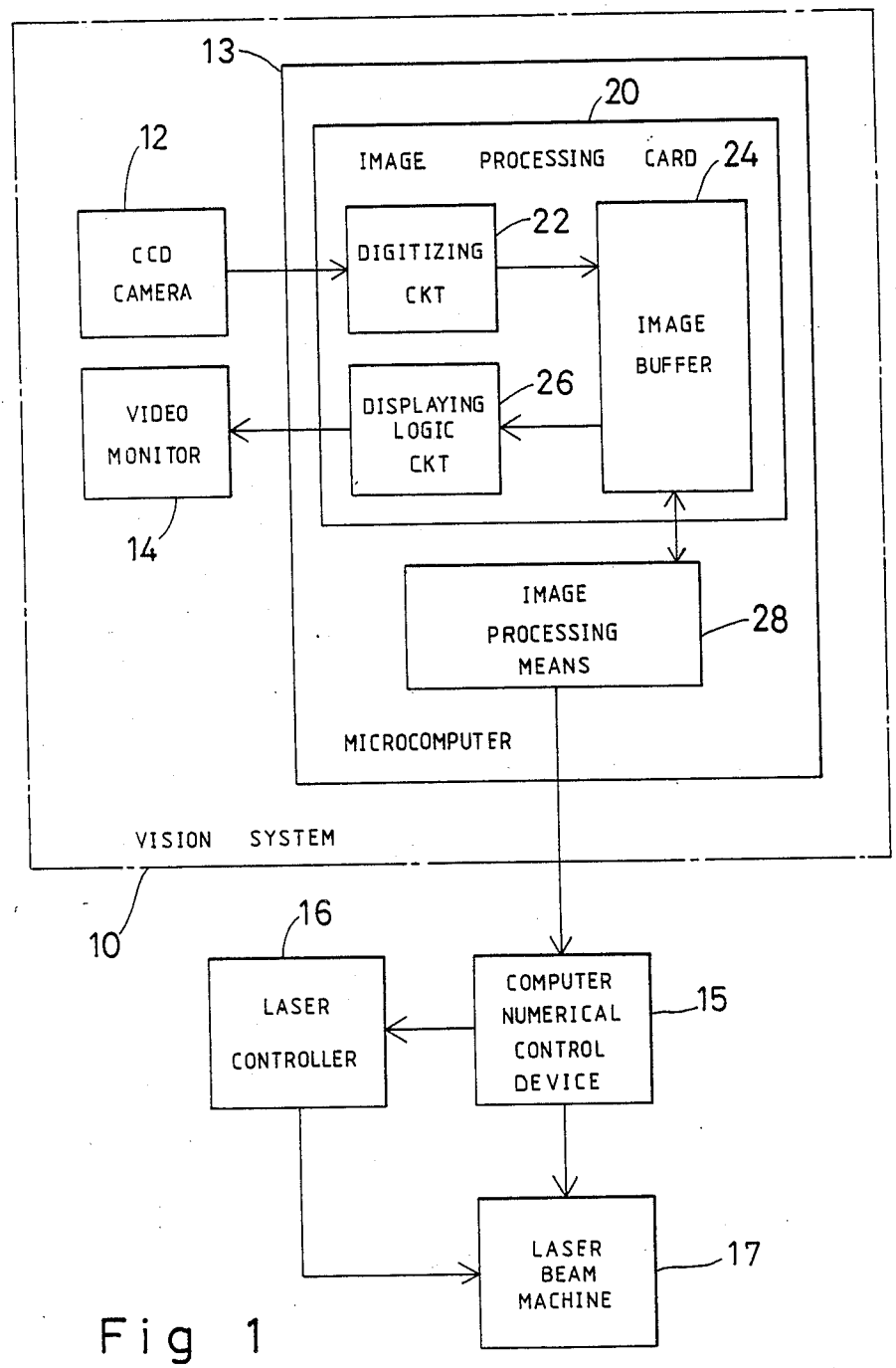
FIG. 1 is a system block diagram of an apparatus for controlling the laser cutting in accordance with one embodiment of the present invention.

Referring now to FIG. 1, the apparatus or system for controlling the laser cutting in accordance with the present invention comprises a vision system 10, a computer numerical control device 15 coupled to the vision system 10, a laser controller 16 coupled to the computer numerical control device 15, and a laser beam machine 17 coupled to the computer numerical control device 15 and laser controller 16. The vision system 10 includes a photographing device 12, such as a charge coupled device (CCD) camera 12, a video monitor 14, and an image processing station or a microcomputer 13, such as an IBM PC/AT, coupled to the CCD camera 12 and the video monitor 14. The microcomputer 13 includes a conventional image processing card 20 which has a digitizing circuit 22, an image buffer 24, and a displaying logic circuit 26, with their connections being clearly shown in FIG. 1. The microcomputer 13 also includes an image processing means 28 coupled to the image buffer 24 of the image processing card 20. The image processing means 28 includes software for selecting contours and skeletons of a photographed pattern image, for converting the photographed pattern image into the vector information, for setting the starting/terminating points of the laser beam, for arranging the sequence of the cutting paths, and for converting the vector information into a CNC program, as will be further described below.

Figure 2:
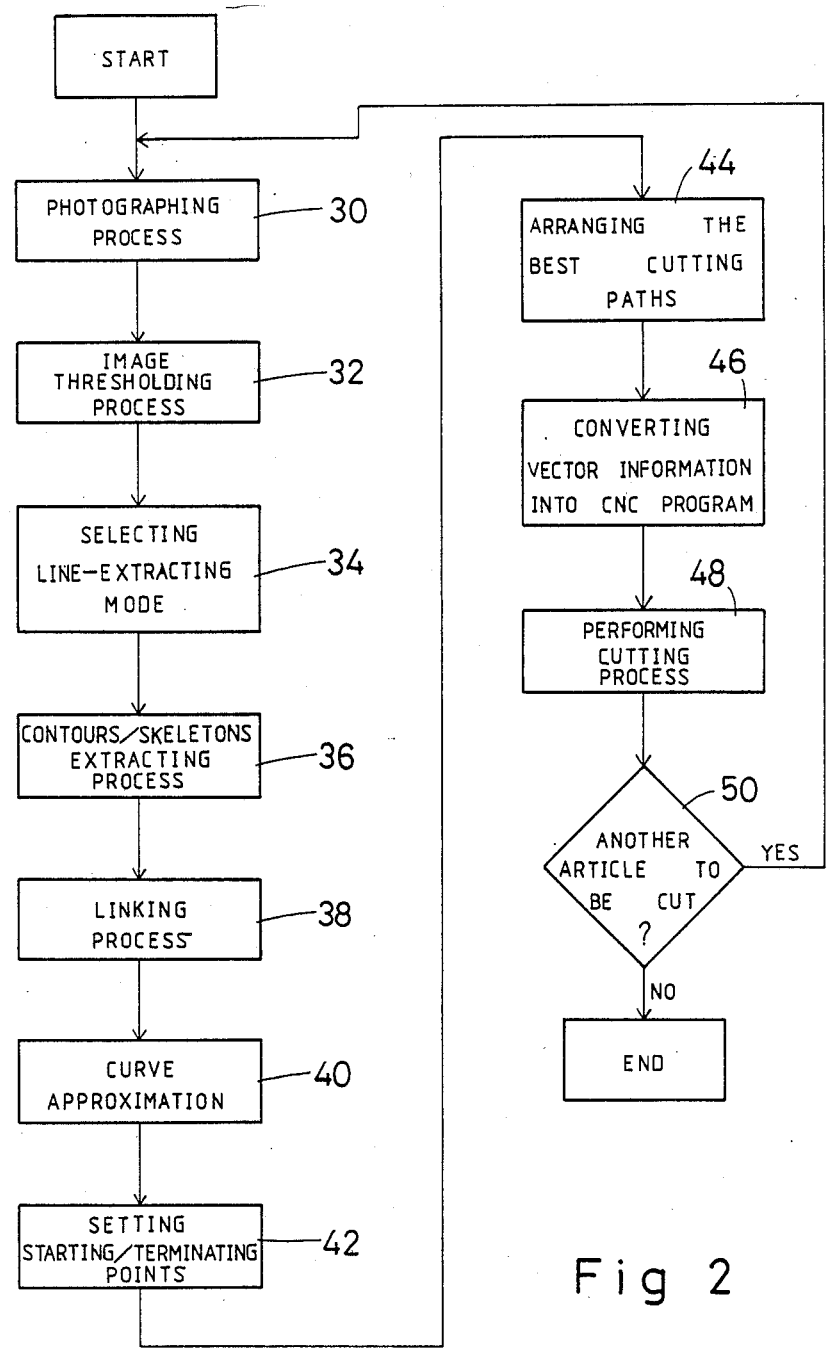
FIG. 2 is a flow chart of the system operation of for the apparatus of FIG. 1, illustrating the steps of the method for one embodiment of the present invention.

Hereinafter, the operation of this preferred embodiment as shown in FIG. 1 will be described with further reference to the flow chart shown in FIG. 2.

Figure 3:
FIG. 3 illustrates an example of a pattern that is used for cutting out an article.

A. Photographing process (30, FIG. 2): a material object of pattern is photographed according to how the product is to be cut, for obtaining an original analog image signal by using the CCD camera 12. In this specification, the pattern 60 of FIG. 3, is photographed as an example to facilitate the understanding of the present invention. The analog image signal is then sent to the image processing card 20, and is digitized into a digital image signal by the digitizing circuit 22. The digital image signal is stored in the image buffer 24 in the form of an array of pixels and the gray levels of the pixels, as well known in the art, and will be referred as an original pattern image.

Figure 4:
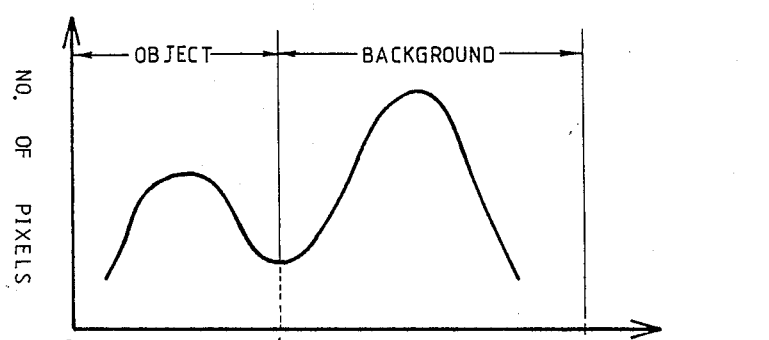
FIG. 4 is a schematic histogram illustrating the gray level distribution of an original pattern image which is photographed from the pattern of FIG. 3 by a camera provided within the apparatus of FIG. 1.

B. Image thresholding process (32, FIG. 2): As is well known in the art, the gray levels of the pixels of the original pattern image obtained in the photographing process 30 are distributed as shown in FIG. 4, Since the object of the present invention is to select the contours and skeletons of the object or pattern 60 in order to perform laser cutting, the original pattern image is first thresholded to obtain a binary pattern image information in the present invention, i.e., all of the gray levels of the object or pattern parts 60, which are stored in the image buffer 24, are changed to the gray level of zero (black, FIG. 4), and all of the gray levels of the background are changed to the gray level of 255 (white, FIG. 4). To achieve a good thresholding effect, the threshold "t" between the object 60 an the background must be precisely determined. After the threshold "t" is determined, the gray levels of the object, which are less than or equal to the threshold "t", are changed to zero, and the gray levels of the background, which are greater than the threshold "t", are changed to 255. The schematic diagram of the thresholded image is shown on the screen 66 of the video monitor 14 in FIG. 5. In the preferred embodiment of the present invention, a Moment-Preserving Thresholding Method is utilized to determine the threshold "t" and to achieve the thresholding process. The method assumes that the moment of the original pattern image will equal the moment of the thresholded image. Since the method is a known image processing technique, nor further description is deemed necessary.

Figure 5:
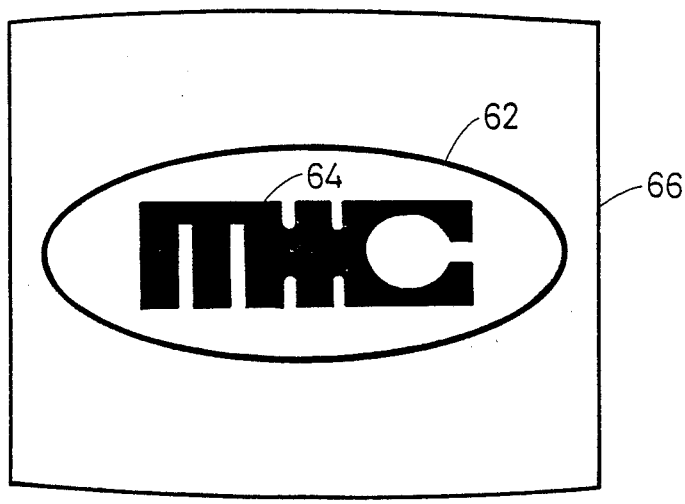
FIG. 5 is a schematic diagram illustrating a binary pattern image which is obtained from a threshold of the original pattern image and is displayed on the screen of a video monitor.

C. Selecting line-extracting mode (34, FIG. 2): After the original pattern image is thresholded, an operator can select one of the following three line-extracting modes for the thresholded pattern image in an interactive manner with the microcomputer 13:

1. contours being extracted from all of the pattern parts of the pattern image;
2. skeletons being extracted from all of the pattern parts of the pattern image; and
3. contours being extracted from some pattern parts of the pattern image, and skeletons from the other pattern parts of the pattern image.
   wherein the term "contour" refers to the outermost line along the pattern part, which is linked by a series of single pixels, and the term "skeleton" refers to a line which is linked by a series of single pixels, and is substantially centrally situated between the two outermost outlines of the pattern part. For facilitating the understanding of the contour and skeleton, in this description the outer ellipse pattern part 62 of FIG. 5 is selected to be extracted in the skeleton extracting mode, and the residual inner pattern part 64 of FIG. 5 is selected to be extracted in the contour extracting mode. Although the ellipse of FIG. 3 is shown as a single line, the line image data formed from the photographing process (30, FIG. 2) will have a thickness, i.e., the transverse direction of the line image of the ellipse pattern part of FIG. 5 includes a plurality of pixels. Consequently, if the operator desires to cut a single ellipse line, the skeleton must be extracted from the line image to assure correct cutting.

If the operator selects mode 1, the system utilizes a conventional contour-filling method to change all of the gray levels of the pattern image stored in the image buffer 24 into a predetermined value, so that during later processes, the system can realize that the pattern image will be cut along its contour. At the same time, the color of the pattern image displayed on the screen 66 of the video monitor 14 is preferably changed in order to be distinguished from the skeleton extracting case.

If the operator selects mode 2, the system retains the gray levels of the pattern image.

If the operator selects mode 3, the operator must further move the cursor (not shown) on the screen 66 of the video monitor 14 to select all of the pattern parts to be machined in the contour mode. Then, the system utilizes the above-described contour-filling method to change the gray levels of those selected pattern parts into the predetermined valves and to change their displaying color. The residual pattern parts which are not selected are treated to be cut in the skeleton mode.

Figure 6:
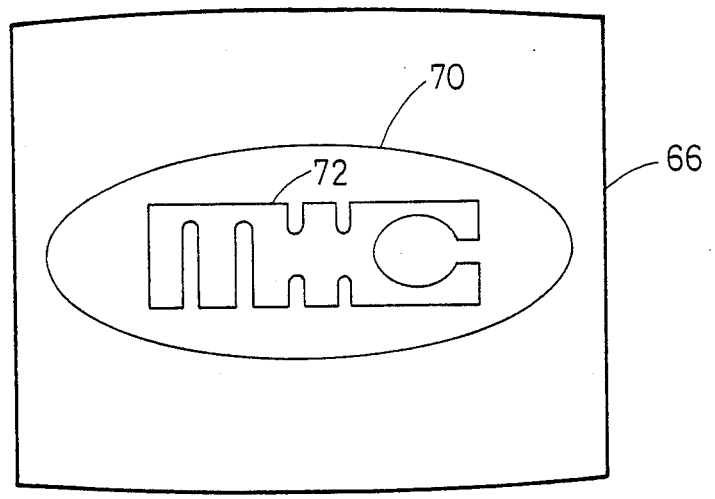
FIG. 6 is a schematic diagram illustrating a pattern image which has been thinned and contour-traced from the thresholded pattern image, and is displayed on the screen of the video monitor.

D. Contours/skeletons extracting process (36, FIG. 2): This extracting process depends on which mode is selected in the above process (34, FIG. 2). The system scans the pattern image stored in the image buffer 24 from left to right and from top to bottom to find the pattern part. Upon finding the first pixel of the pattern part, the gray level of the first pixel is compared. to the predetermined value to determine the pattern part that is desired to be cut in the contour mode or the skeleton mode.

a. If the skeleton mode is desired, the system utilizes a conventional thinning rule to extract all of the skeleton pixels of the pattern part and to change the gray levels of the other pixels of the pattern part to a value of 255. For example, a thinned ellipse 70 is shown in FIG. 5.

b. If contour mode is desired, the system utilizes a conventional contour-tracing method to extract all of the contour pixels of the pattern part and to change the gray levels of the other pixels of the pattern part into value 255. For example, a contour-tracted outline 74 is shown in FIG. 6.

E. Linking process (38, FIG. 2): In the above processes (30 to 36, FIG. 2) the pattern image is stored in the image buffer 24 in the form of an array of pixels. For converting the image information into vector information, the characteristic points of each of the contours and skeletons must be linked in a point by point order. The system scans the pattern image stored in the image buffer 24 from left to right and from top to bottom to find the characteristic points of the contour and skeleton. As shown in FIG. 6, one of the characteristic points of the ellipse skeleton 70 will be found first, and the system then takes out all of the characteristic points of the ellipse skeleton 70, in a counterclockwise sequence, for example, on the basis of the one characteristic point. All of the characteristic points are stored point by point into an outer memory device of the microcomputer, such as a hard disk or floppy disk (not shown), and their gray levels in the image buffer 24 are changed to a value of 255 point by point. When the ellipse skeleton 70 is completed, the system continues scanning the pattern image. As shown in FIG. 6, when one of the characteristic points of the inner contour 72 is found, the linking process described above is repeated again. In this linking process (38, FIG. 2), if the system forms an intersection, it will select the smoothest path to link the contour or skeleton, i.e. the path which causes the smallest deflection angle.

Figure 7:
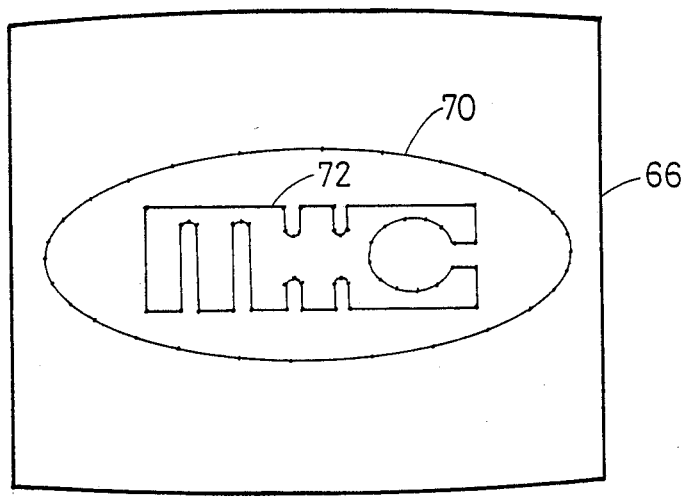
FIG. 7 is a schematic diagram illustrating a pattern image which includes thereon starting/ending points of vectors obtained from the image of FIG. 6 by a curve approximation process, and is displayed on the screen of the video monitor.

F. Curve approximation (40, FIG. 2): In this process the characteristic points of each linked line obtained by the above process (38, FIG. 2) are processed by a curve approximation method to be replaced by several necessary turning points or vector points, for example the larger black points shown in FIG. 7, to obtain vectors and to compress the image. The vector points for each linked line is formed by a series of line vector data. As a result, the need for memory space is significantly reduced. The curve approximation method used in this preferred embodiment takes the first and second characteristic points of one pattern part as a basis to determine whether the deflection angle of the sequential characteristic point, i.e., the third characteristic point, is greater than a predetermined angle. If the deflection angle is less than the predetermined angle, the point is removed, and then the next point is continuously checked. If the deflection angle is greater than the predetermined angle, the point is retained as a vector point, and then the second characteristic point is removed. Thereafter, the last vector point and its next characteristic point are taken as a basis to determine whether the deflection angle of their seguential characteristic point is over the predetermined angle, and so on. The above-mentioned steps of this process (40, FIG. 2) are repeated until all of the characteristic points are completely checked and processed. It should be understood that the degree of the predetermined angle depends on the requirement of the cutting precision in different applications.

G. Setting the starting/terminating point of laser beam (42, FIG. 2): The conventional laser beam machine frequently produces a larger hole at the starting-/terminating point, and thus the setting of the starting-/terminating point is needed to assure the cutting quality. Generally, the starting and terminating points of laser beam in one close line is the same. The system will first display all of the original starting points of all the series of line vector data obtained from the above process (40, FIG. 2), and the operator can move the cursor on the screen 66 of the video monitor 14 to the positions, which would act as starting/terminating points, to set all of the starting/terminating points for all cutting lines.

Figure 8:
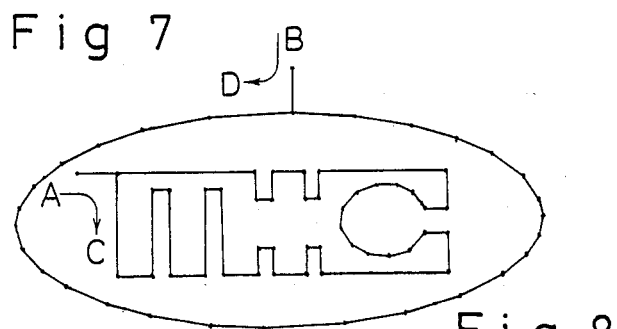
FIG. 8 shows the starting/terminating points of the laser beam, which are set by an operator, and the cutting paths.

H. Arranging the best cutting paths (44, FIG. 2): Since the bottom of the article to be cut is not wholly supported on the X-Y table of the laser beam machine, it is important that the sequence of the cutting paths must be arranged from the innermost line to the outermost line to assure that all of the lines are wholly cut. In processes (36, FIG. 2) and (38, FIG. 2), since the scanning sequence is from left to right and from top to bottom, the original sequence of the extracted lines is arranged from outside to inside. Therefore, the system inverts the original sequence, i.e., the original first line is changed to be the last line, the original second line is changed to be the last second line, and so one. As shown in FIG. 8, the new first line to be cut begins from point A along a counterclockwise direction which is indicated by arrow C, and the new second line begins from point B along a counterclockwise direction which is indicated by arrow D.

I. In process (46, FIG. 2) the system converts the rearranged series of line vector data into a CNC machining program to achieve an automatic control purpose. The converted program can also include the control instructions for the machining speed. Finally, the CNC program is transmitted to the computer numerical control device 15 through an interface, such as an RS-232 interface, in order to control the laser controller 16 and the laser beam machine 17 to perform a cutting process (48, FIG. 2). Since the conversion of the CNC program is well known in the art, no further description is deemed necessary.

J. Finally, in process (50, FIG. 2) the system determines whether another article is desired to be cut. If another article is not desired to be cut, the operation is terminated. If another article is desired to be cut, the above processes are repeated again.

While the invention has been described in terms of what is presently considered to be the most practical and preferred embodiment, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. A method for controlling laser cutting by a laser beam machine, comprising the steps of:
   (a) photographing an object with a photographing device for developing an original pattern image;
   (b) thresholding said original pattern image for developing binary pattern image information;
   (c) selecting from a contour extracting mode for extracting contours of said binary pattern image information, a skeleton extracting mode for extracting skeletons of said binary pattern image information, and a combination mode of said contour extracting mode for extracting the contours of a first portion of said binary pattern image information and said skeleton extracting mode for extracting the skeletons of remaining portions of said binary pattern image information;
   (d) scanning said binary pattern image information and extracting at least one of the contours and the skeletons of said binary pattern image information in response to said step (c);
   (e) linking said one of the contours and the skeletons from said step (d) in a point by point sequence;
   (f) converting said one of the contours and the skeleton is into a series of line vector data, respectively, by a curve approximation process;
   (g) setting a starting/terminating point of said laser beam machine for said series of line vector data;
   (h) rearranging the sequence of said series of line vector data from an innermost line to an outermost line thereof; and
   (i) converting said rearranged series of line vector data into a computer numerical control program, and inputting said program into a computer numerical control device for controlling the cutting paths of said laser beam machine.

2. A method as claimed in claim 1, wherein said step (c) comprises changing gray levels of said first portion of said binary pattern image information selected to be extracted in said contour extracting mode into a predetermined value for distinguishing purposes.

3. A method as claimed in claim 1, wherein said step (b) comprises thresholding said original pattern image by a moment-preserving thresholding process.

4. A method as claimed in claim 1, wherein said step (d) comprises a scanning sequence from left to right and from top to bottom of said pattern image information.

5. A method as claimed in claim 1, wherein said step (a) comprises a charge coupled device camera for photographing said object.

6. An apparatus for controlling laser cutting of a laser beam machine, comprising:
   A photographing device for photographing an object and developing an original pattern image;
   an image processing station coupled to said photographing device including,
      an image processing card for receiving said original pattern image, and for converting said original pattern image into a digital pattern image,
      thresholding means for thresholding said digital pattern image to develop a binary pattern image information,
      extracting means for extracting at least one of a plurality of contours and skeletons from said binary pattern image information of said thresholding means,
      first converting means for converting said one of said contours and skeletons from said extracting means into a series of line vector data,
      setting means for setting a starting/terminating point for said series of line vector data,
      rearranging means for rearranging the sequence of said series of line vector data from an innermost line to an outermost line thereof, and
      second converting means for converting said series of line vector data having the sequence rearranged by said rearranging means into a computer numerical control program; and
   a computer numerical control device coupled to said image processing station for receiving said computer numerical control program, and coupled to said laser beam machine for controlling laser cutting of said laser beam machine in response to said computer numerical control program.

7. An apparatus as claimed in claim 6, wherein said thresholding means comprises a moment-preserving thresholding process for thresholding said digital pattern image.

8. An apparatus as claimed in claim 6, wherein said extracting means comprises:
   selecting means for selecting a contour extracting mode for extracting contours of said binary pattern image information, a skeleton extracting mode for extracting skeletons of said binary pattern image information, and a combination mode of said contour extracting mode for extracting the contours of a first portion of said binary pattern image information and said skeleton extracting mode for extracting the skeletons of remaining portions of said binary pattern image information; and
   scanning means for scanning said binary pattern image information and extracting at least one of the contours and the skeletons of said binary pattern image information in response to the mode selected by said selecting means.

9. An apparatus as claimed in claim 8, wherein said first converting means comprises:
   linking means for linking said one contour and skeleton extracted by said scanning means in a point by point sequence; and
   third converting means for converting each of said contours and skeletons from said linking means into a series of line vector data, respectively by a curve approximately process.

10. An apparatus as claimed in claim 6, wherein said photographing device comprises a charge coupled device camera.

* * * * *